Jan. 9, 1962 J. R. BRISSON 3,016,157
LOADER APPARATUS
Filed Dec. 19, 1957 5 Sheets-Sheet 1

INVENTOR.
JOHN R. BRISSON
BY
Andrus, Sceales & Starke
ATTORNEYS

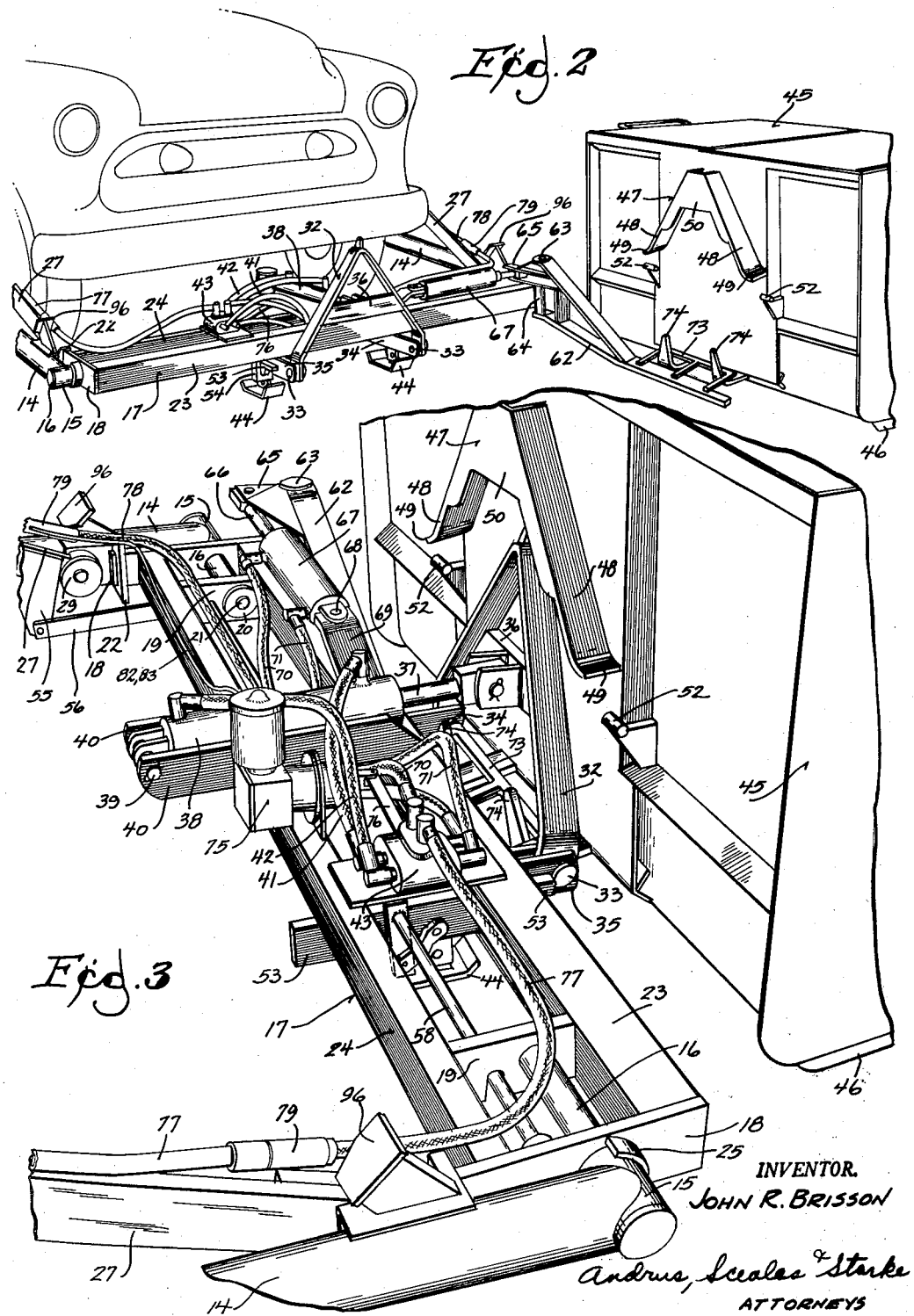

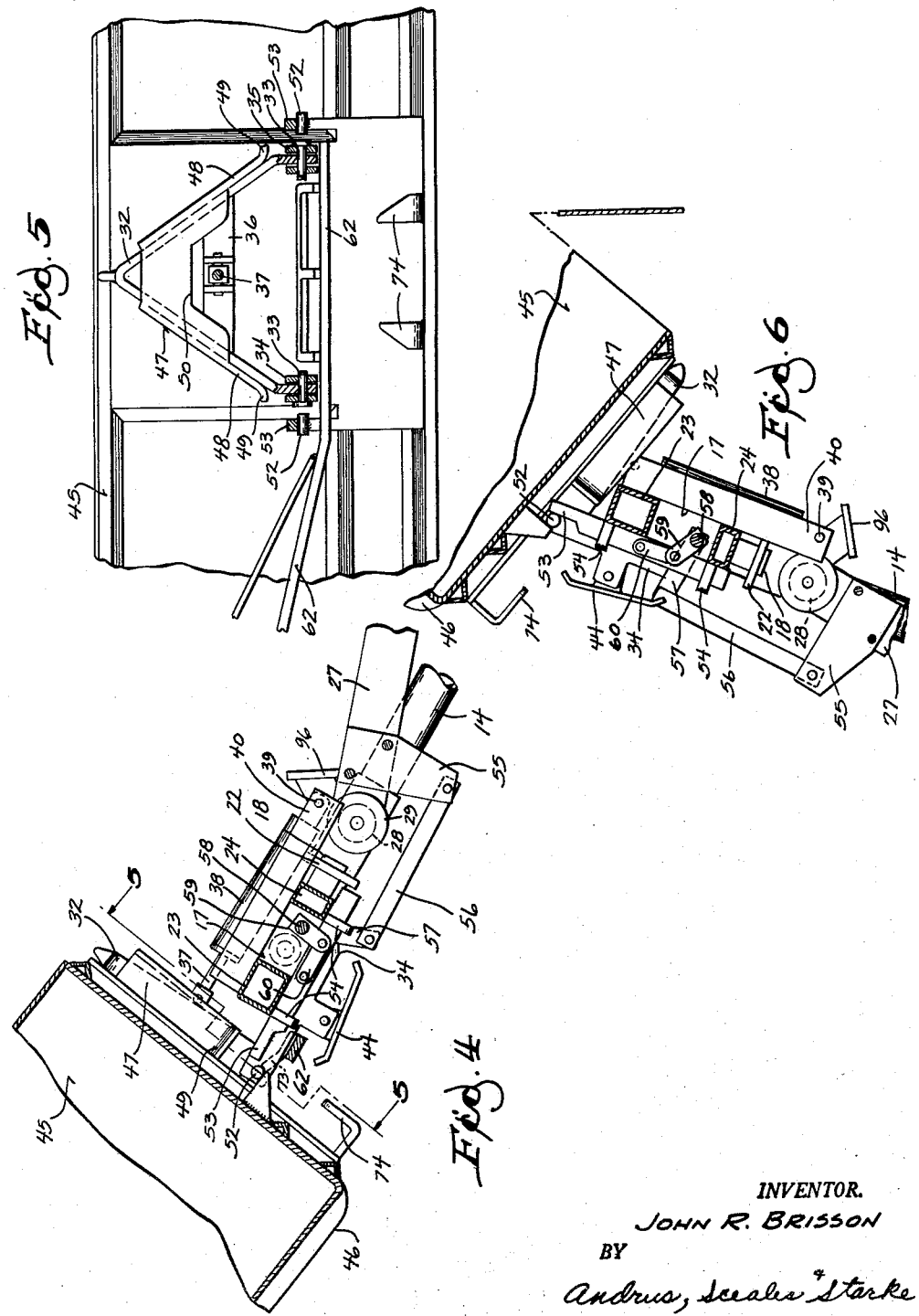

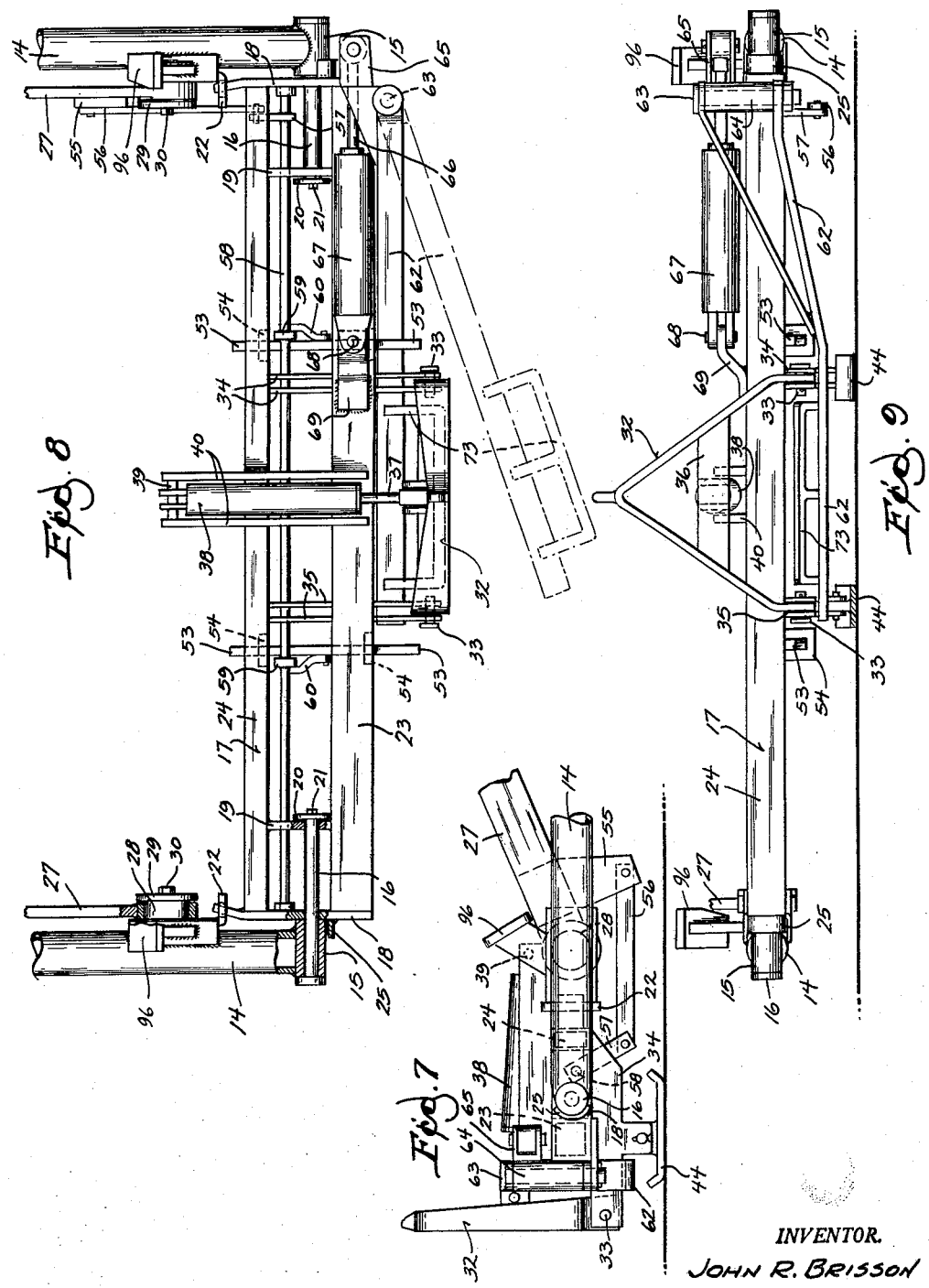

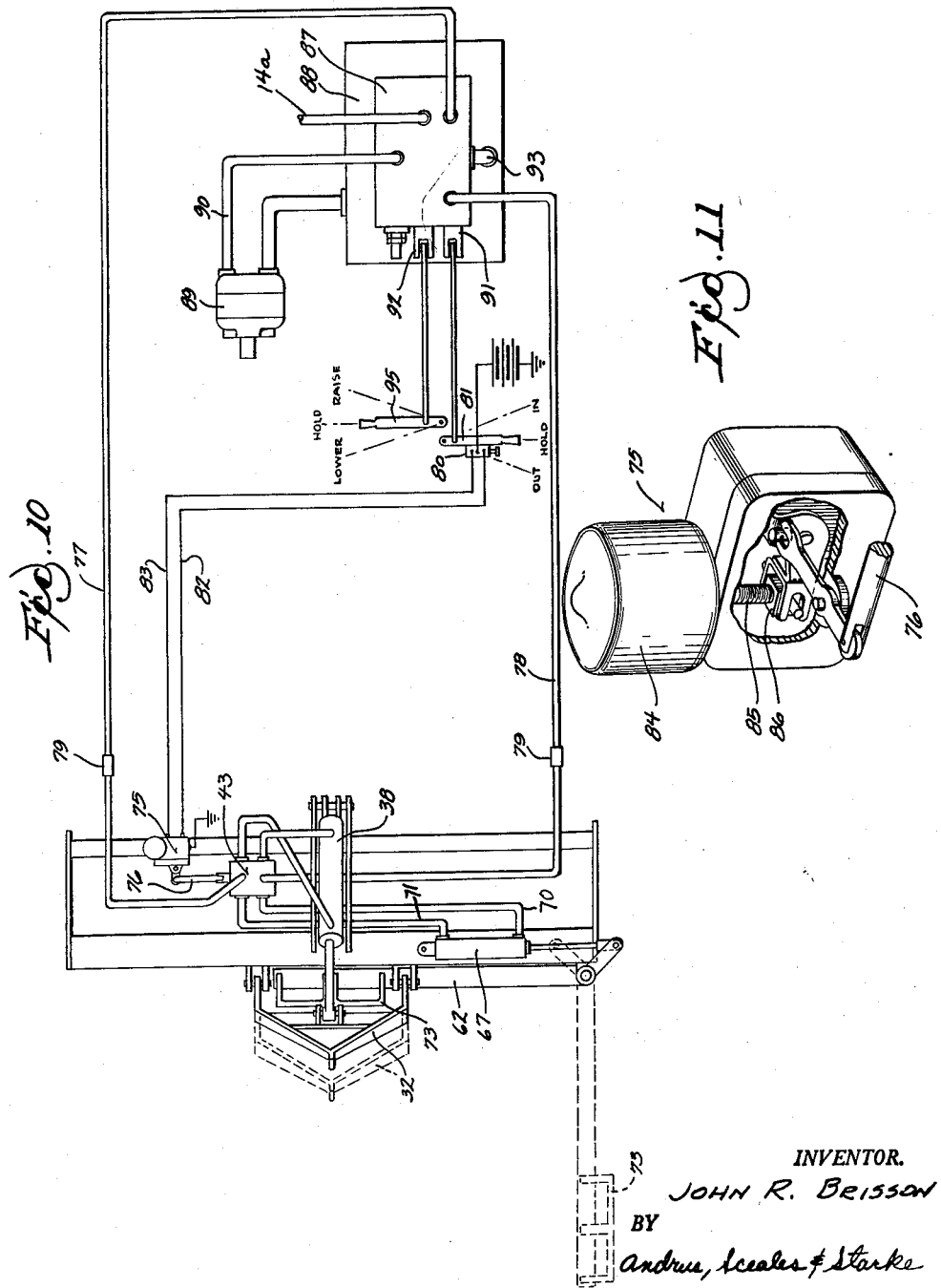

United States Patent Office 3,016,157
Patented Jan. 9, 1962

3,016,157
LOADER APPARATUS
John R. Brisson, Norway, Mich., assignor to Lodal Inc., Norway, Mich., a corporation of Michigan
Filed Dec. 19, 1957, Ser. No. 703,822
10 Claims. (Cl. 214—302)

This invention relates in general to loaders and material handling devices. More particularly the invention relates to a truck loader mechanism to which prefilled containers can positively and easily be attached for overhead dumping into the truck.

Truck loading systems of this general character are known in this art. One of their major shortcomings, however, is the accuracy with which the loader frame must be aligned with the container to insure proper hookup. The interengaging hook-up elements on the container and truck are such as to require accurate alignment in longitudinal, lateral and vertical directions. Furthermore, once these containers have been loaded, it is difficult to position them and sufficient surrounding space must be maintained to permit maneuvering of the truck for hook-up with the container.

In accordance with the present invention a container hook-up mechanism is provided which does not require particularly accurate initial alignment between the container and loader frame. The arrangement is such that the container is contacted by the loader connecting element and is guided into its proper position and securely mounted in place.

The invention also provides a loader mechanism of the above type in which the container is automatically locked and unlocked to the lifting mechanism when the latter reaches predetermined positions in its operating cycle.

Another aspect of the present invention provides novel mechanism for moving the pre-filled container from an otherwise inaccessible location to a position where the container can be guidingly positioned and hooked up by the loading mechanism on the truck. This novel sweep-arm mechanism permits the containers to be spotted against buildings in narrow alleys, for example, or in other areas which are too restricted for the truck to maneuver into a direct hook-up.

The invention provides a hook-up mechanism for a container which is easy to operate and does not require accurate pre-positioning of the container.

The entire hook-up operation is performed within the operator's vision. The arrangement is foolproof in that if the connection is not properly made, neither damage nor inadvertant dumping of the container will occur.

These and other objects and advantages of the invention will appear hereinafter as this disclosure progresses, reference being had to the accompanying drawings in which:

FIGURE 2 is a front perspective view of the container and truck shown in FIGURE 1, but showing the container just after it has been grasped by the sweep arm and preparatory to being positioned directly in front of the truck for hook-up to the loader.

FIGURE 3 is a fragmentary perspective view, on an enlarged scale, of the loader mechanism and container shown in FIGURE 2, just prior to the connection of the interengaging elements;

FIGURE 4 is a fragmentary, side elevational view, with certain parts in section, of the container mounted on the loader mechanism and in the partially raised position;

FIGURE 5 is a sectional view taken on line 5—5 of FIGURE 4;

FIGURE 6 is a view similar to FIGURE 4, but showing the container in the dumping position in which it is locked to the loader mechanism;

FIGURES 7, 8 and 9 are side elevational, plan and front views, respectively, of the front end of the loader mechanism, certain parts broken away, removed and in section for clarity in the drawings;

FIGURE 10 is a schematic diagram of the hydraulic and electrical circuits; and

FIGURE 11 is a perspective of the electric shifter mechanism.

Loader mechanism

Figure 1:
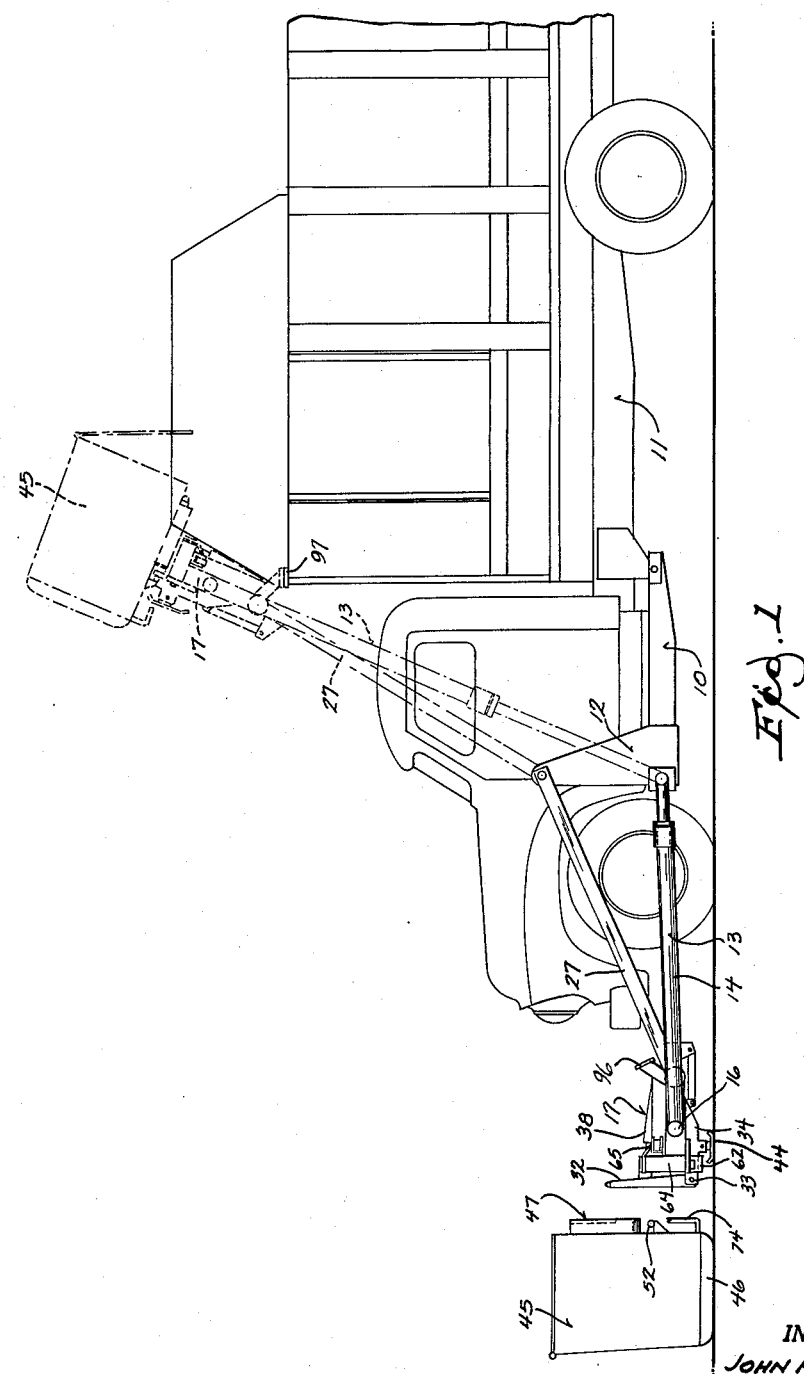
FIGURE 1 is a side elevational view of a truck and container embodying the invention.

Referring in greater detail to the drawings, a loader attaching frame 10 is rigidly secured to the truck 11 and includes an upright support member 12 on each side on the truck.

A hydraulic boom cylinder assembly 13 is pivoted at its rear to the lower end of each member 12 and these assemblies extend forwardly of the truck. These hydraulic cylinder assemblies are single acting and are extensible in the known manner by admission of pressure fluid to cylinder portion 14 via conduit 14a (FIG. 10). A short tubular member 15 is welded across the front end of the cylinders 14, forming a trunnion eye and sealing the front end of the cylinder. Removable mounting pins 16 extend through the members 15 on which are mountable various implements such as buckets, scrapers and other attachments.

For purposes of this invention, however, a transverse rectangular shaped frame 17 is mounted by its end members 18 and cross braces 19, which receive the mounting pins 16. Pins 16 are held captive in the elongated frame 17 by the large washers 20 secured to the inner ends of the pins by the cap bolts 21.

To prevent the attached implement, or frame 17 in the present case, from rotating about the mounting pins 16 when the loader is actuated, the end members 18 extend rearwardly, thus forming torque arms which are insertable in the slotted brackets 22 welded to the boom cylinders 14.

To detach the mounting frame 17 from the booms, the pins 16 are removed and the truck backed away, causing the torque arms to be disengaged from the slotted torque arm receiving brackets 22.

The mounting frame 17 also includes the transverse tubular members 23 and 24 to which the end members 18 and cross braces 19 are welded. A stop 25 is welded to the outside of each end member 18 and abuts against the trunnion eye 15 when the latter is aligned with the apertures in the end members 18 and braces 19 so as to insure ready insertion of pins 16.

A radius rod 27 is pivotally attached at its rear end to the upper end of support member 12 at each side of the truck. The front end of the radius rods are pivotally connected, as shown clearly in FIGURE 8, to a stub shaft 28 extending inwardly on the booms 14. A large washer 29 in held by cap bolt 30 on the stub shaft to secure the radius rod in place.

A loader mounting triangle 32 is pivotally mounted on pins 33 on the loader frame 17 and forms a male inter-engaging member. This mounting is formed by two pairs of spaced, forwardly extending arms 34, 35 which are welded to the underside of tubular frame members 23, 24 and which receive pins 33 through their front ends.

The loader triangle terminates at its upper end in a pointed portion and has a cross member 36 welded between its side legs.

A hydraulic servo-motor is connected between the loader frame and the triangle for tilting the latter, if desired. This fluid motor includes a hydraulic piston rod 37 pivotally attached to the triangle, and the cylinder 38 pivotally mounted at its rear end on pin 39 carried by the double arm bracket 40. The bracket 40 is welded to the top side of tubular frame members 23, 24 and forms an integral part of the loader frame. A fluid conduit 41 is in communication with the rod end of cylinder 38 and conduit 42 is connected with the head end of the cylinder. Conduits 41, 42 at their other ends are connected to the selector valve 43 which is mounted on the loader frame.

Ground engaging shoes 44 are pivotally mounted to the underside of the loader frame, and the loader mechanism can rest on these shoes on the ground during the container hook-up or unhooking procedure.

Container

The container 45 is fabricated from sheet metal and is of considerable size. When loaded with material, it is of considerable weight and difficult to move by hand. If stored on a hard surface, the container may be mounted on casters, but for purposes of this illustration, the container is shown as having skids 46 at each end on its bottom. A V-shaped interengaging member 47 is welded on the back side of the container and forms the female connecting member which is adapted to securely receive the loader triangle 32. The member 47 comprises flat side legs 48 which converge upwardly and have outwardly flared portions 49 at their lower ends. A cross brace 50 connects the upper ends of the legs 48 and the member 47 is open at its extreme upper end. By means of the triangularly shaped connecting elements which have flat sides that provide a good bearing surface, a tight wedging connection is effected between the loader and container.

Container locking means

In accordance with another aspect of the invention, automatically actuated means are provided for locking the loader triangle within the container interengaging member 47 in order to prevent the container from slipping off the loader trangle when in the position shown in dotted lines in FIGURE 1. This locking action occurs when the container has reached a predetermined elevation in its upward swinging to to the dumping position mentioned. As the container is being lowered, the locking mechanism is disengaged so that by the time the container is again on the ground, the loader triangle can be readily removed from the female V-shaped connecting member 47. In other words, this locking and unlocking action is automatic and requires no attention on the part of the operator to effect its actuation.

This locking means comprises a pair of laterally spaced locking lugs 52 which are rigidly secured to the back wall of the container. A pair of locking bars 53 are slideably mounted in brackets 54 on the underside of the loader frame and when in the forward position, are adapted to pass over the upper side of the locking lugs 52 as shown in FIGURE 6. In this figure, the container has been moved upwardly a sufficient amount to cause the bars 53 to pass over the lugs 52 and thus prevent the container from dropping off the loader triangle.

The locking bars are actuated by a linkage as follows:
A plate 55 is rigidly secured to one of the radius rods 27 and a link 56 is pivotally connected at the lower end of this plate. The forward end of link 56 is pivotally connected to one end of link 57. The other end of link 57 is rigidly secured to a rock shaft 58 which extends for substantially the entire length of the loader frame and is rotatably mounted therein. A pair of laterally spaced arms 59 are also rigidly secured to the rock shaft 58 and each have a link 60 pivotally connected to one of their ends. The other end of link 60 is pivotally connected to the locking bars 53. The action is such that upon elevation of the radius rod 277, the locking bar is slid from the position shown in FIGURES 3 and 4 to the locked position shown in FIGURE 6. Stated otherwise, relative angular movement between the radius rods 27 and the loader frame causes the movement of the linkage to shift the locking bars 53. As shown in FIGURE 5, the lugs 52 and triangle pins 33 must be coaxially aligned on the pivot axis for the container in order to prevent any binding when the container is tilted.

Container positioning means

Means are also provided for moving the filled container from its storage position to a posiion directly in front of the loader frame where the interengaging member 47 of the container can be contacted by the loader triangle 32. This positioning mechanism comprises a hydraulically actuated sweep arm which is pivotally mounted at one end of the loader frame and which can be swung to a laterally offset position where it can grasp the container and then swing the latter to a position directly in front of the truck. This sweep arm comprises an arm assembly 62 which is pivotally mounted on the vertical pin 63 carried by the trunnion 64. Trunnion 64 in turn is welded to the front side of the tubular beam 23. The sweep arm assembly also includes a crank portion 65 to the outer end of which is pivotally connected the piston rod 66. The cylinder 67 for the piston rod is pivotally connected at 68 to a brace 69 which in turn is welded on the tubular member 23. This cylinder-piston is also of the double acting type and has conduits 70, 71 which are in communication with the rod end and head end of the cylinder, respectively. The other ends of these conduits are also connected to the selector valve. Thus the sweep arm is power operated in either the opening or closing direction to forcibly position the container in front of the loader frame or to the storage position at the side of the roadway. The sweep arm also includes a container engaging means at its outer end in the form of the open bracket member 73 which is adapted to slip over the upwardly extending prongs 74 carried by the container.

To effect hook-up of the sweep arm to the prongs 74, the sweep arm is first elevated and swung to a position where the bracket 73 is above the prongs 74. The sweep arm is then lowered so the brackets 73 slip over the prongs. The sweep arm is then swung by the hydraulic cylinder unit to the closed position where the container connecting member 47 is directly in front of the loader triangle. As the latter is raised to effect the connection to the container member 47, the sweep arm is lifted clear of the prongs 74, and thus when the container is connected to the loader frame, the sweep arm is disconnected from the container. As a result, the container is free to tilt without interference from the sweep arm.

Controls

The selector valve 43 is shifted by an electric shifter mechanism 75 through an actuating link 76. The electric mechanism is operated by the simple reversing electric switch 80 (FIG. 10) mounted in finger tip reach on the control lever 81 in the operator's cab. The switch 80 is connected to the shifter mechanism 75 by the electric wires 82 and 83 which extend along the boom and then across the loader frame. The electric shifter as shown in FIG. 11 comprises a reversible electric motor 84 which drives the threaded shaft 85 and causes the nut 86 to move along the shaft in either direction. The nut in turn causes the lever to shift the link 76, thus actuating the selector valve 43 in a direction to operate either the sweep arm or the pick-up triangle, as will appear.

A pair of conduits 77, 78 have quick detachable couplings 79 which facilitate the removal of the loader frame from the hydraulic booms. These conduits 77, 78 extend along the radius rods and are connected to the loader control valve 87 which is mounted on top of the reservoir 88 carried on the vehicle. The other ends of conduits 77, 78 are connected to the selector valve 43. The hydraulic pump 89 forces fluid pressure into the loader control valve via conduit 90. The control valve 87 is conventional and when either of its spools 91, 92 are shifted, the valve is open and pressure fluid passes directly therethrough and into the reservoir via conduit 93. With this arrangement, the conduits 77, 78 furnish pressure to either the sweep arm hydraulic cylinder or the container tilting hydraulic cylinder depending on the position of the selector valve as determined by the switch 80. The sweep arm and container cylinder are double acting and pressure fluid is admitted to them via either conduit 77 or 78, the other conduit acting as the return to sump. The direction of flow is determined by the double acting valve spool 91 by which pressure fluid is directed to either conduit 77 or 78. These cylinders are not operated at the same time and, therefore, by means of the electrically operated selector valve, only a single pair of conduits is required from the source of fluid pressure to actuate the sweep arm or pick up triangle cylinders in either direction, and only a single control lever 81 is necessary.

The loader lever 95 controls the vertical positioning of the entire loader and is positionable in either a lower, hold or raise position, wherein its spool valve 92 permits pressure fluid to flow from the single acting boom cylinders, be locked therein, or flow to the boom cylinders, respectively, in the known manner.

General

The hydraulic booms each have a stop member 96 secured adjacent their front ends which are adapted to abut against complementary stop members 97 carried on the truck. These stops serve to limit the swinging movement of the loader when the dumping position is reached.

It is not entirely necessary, in some installations, to tilt the bucket relative to the loader frame by means of the hydraulic cylinder and piston in order to unload it. As will be seen from FIGURE 1, the container will assume a sufficiently inclined position so as to permit the material to empty therefrom without the aid of additional tilting movement of the container. In other words, the loader triangle 32 may be rigidly attached to the loader frame if desired. However, under certain circumstances, tiltability of the loader triangle is desirable, particularly when attempting to insert it into the connecting element 47 if considerable angular displacement exists between the container and the loader frame, either in a transverse or longitudinal direction.

The loader triangle cylinder unit is also useful to prevent dumping of the container too early in the rearward swinging movement. Stated otherwise, as the container passes over the vehicle cab, the piston 37 may be extended to hold the container tilted forwardly, thereby holding the container doors shut to prevent premature spilling of material from the container. To dump the container, the operator then simply causes the piston 37 to retract. The doors then open by gravity, discharging the load.

With this present arrangement, it is unnecessary for the container to be accurately aligned relative to the loader frame to effect the connection. It is only necessary for the apex of the triangle to be positioned somewhere within the female member 48, and this may be facilitated by tilting the triangle. The loader frame is then elevated until the connecting member 48 of the container settles onto the triangle 32. In other words, upon initial contact with the container, raising the triangle 32 causes the container to be elevated slightly during the connecting process and it "floats" onto the triangle 32. The container connecting member 47 then wedges tightly on the loader triangle and securely mounts the container on the loader frame where it is impossible for it to become loose.

The entire hook-up procedure is within the driver's vision which greatly facilitates making the connection. If for some reason the triangle does not enter the connecting member 48, for example if the triangle is not in a forward enough position, and the operator is unaware of the misalignment, no damage will occur when he raises the loader. The loader will lift and the container will simply fail to be moved—it will not accidentally be dumped as in other prior art devices.

This arrangement provides a one-man loading operation by means of which a heavy container stored in an otherwise inaccessible place may be quickly swung into connecting position with the loader, positively connected thereto and then elevated and locked in place while swung to the dumping position.

Various modes of carrying out the invention are contemplated as being within the scope of the following claims particularly pointing out and distinctly claiming the subject matter which is regarded as the invention.

I claim:

1. A loader mechanism comprising, an elevationally positionable frame pivotally connected at one end to a vehicle, a male interengaging member carried on a forward portion of said frame, said member having portions converging in an upward direction when said frame is in a lowered position, a container adapted to be lifted by said frame, a female interengaging member secured to a side wall of said container and complementary to said male member, said female member being constructed and disposed to receive said male member when the latter is inserted in the former as said frame is raised and means actuatable upon raising of said frame to lock said male member in wedged engagement with said female member.

2. In a loader mechanism, an elevationally positionable frame adapted to be pivotally mounted on a vehicle, a vertically disposed triangle-shaped male wedge member mounted adjacent a front portion of said frame and having flat side portions, a material container, and an inverted V-shaped interengaging member having flat side portions secured to a side wall of said container and complementary to said wedge member, said wedge member insertable in said female member and wedgingly held therein when said loader is raised, and means actuatable by raising of said loader to lock said male member in wedged engagement with said female member.

3. Loading apparatus comprising, an elevationally positionable elongated frame pivotally mounted on a vehicle, an upright triangle mounted on a front central portion of said frame, a sweep arm pivotally secured at one end to said elongated frame adjacent one end thereof and having a container engaging means on its free end swingable between laterally offset and centrally located positions with respect to said frame, a material container having an inverted V-shaped member secured thereto and complementary to said triangle, power means on said vehicle to raise said frame and thereby wedgingly insert said triangle in said V-shaped member when said loader is raised, and power means mounted on said frame for swinging said arm between said positions to thereby position said container adjacent said triangle.

4. In a loader mechanism, an elongated and elevationally positionable frame pivotally mounted on a vehicle, an upright triangle-shaped male interengaging member mounted on a front portion of said frame, a sweep arm pivotally secured to said elongated frame adjacent one end thereof and having a free end swingable between laterally offset and centrally located positions with respect to said frame, a material container, an inverted V-shaped interengaging member secured to a rear side of said container and complementary to said male member, power means on said vehicle to raise said frame and thereby wedgingly insert said male member in said V-shaped member when said loader is raised, power means mounted on said frame for swinging said arm to bring said container adjacent said male member, and means on said free end for detachable connection to said container.

5. In a loader mechanism, an elongated and elevationally positionable frame pivotally mounted on a vehicle, an upright triangle-shaped male interengaging member pivotally mounted on a front portion of said frame, a hydraulic servo-motor connected between said frame and said male member for tilting the latter, a sweep arm pivotally secured at one end to one end of said elongated frame and having container grasping means at its other end swingable between laterally offset and centrally located positions with respect to said frame, a material container, an inverted V-shaped interengaging member secured to a rear side of said container and complementary to said male member, power means on said vehicle to raise said frame and thereby wedgingly insert said male member in said V-shaped member when said loader is raised, a second hydraulic servo-motor mounted on said frame for swinging said arm, a hydraulic selector valve mounted on said frame, said servo-motors and said power means connected to said valve for independent operation thereby, and an electric shifter mechanism mounted on said frame and having a connection with said valve for operating the latter.

6. A loader mechanism comprising, a loader frame adapted to be pivotally attached to a vehicle for vertical swinging in respect thereto and positioned generally transversely of said vehicle, a male member pivotally secured to a central portion of said frame, a container having a female member secured thereto, said male and female members being constructed for interengagement when said container is positioned generally adjacent said male member and when said frame is raised vertically, container engaging means pivotally connected to said frame for moving a laterally offset container generally adjacent said male member of said frame, first power means on said frame for actuating said container engaging means, second power means for pivoting said male member relative to said frame to facilitate interengagement of the male and female members and to permit controlled dumping of the container contents as the container is elevated on said frame, and linkage means actuatable by the raising of said frame for automatically locking said male member relative to said female member.

7. A loader mechanism comprising, a loader frame pivotally attached to a vehicle for vertical movement in respect thereto and extending generally transversely of said vehicle, a male connecting member pivotally secured to said frame, a container having a female member provided on a side thereof with said female member being normally disposed vertically above said male connecting member, said male connecting member being insertable within said female connecting member when the former is in general vertical alignment with the latter and when said loader frame is raised, a sweep arm pivotally connected at one end to said loader frame and having container engaging means at the other end, first power means connected between said frame and said arm for moving a container generally adjacent said frame and to position said female and male members in general vertical alignment, second power means connected between said frame and said male connecting member for pivoting the latter to facilitate insertion of the male connecting member into said female connecting member and for permitting controlled dumping of the container contents as the frame is elevated, and linkage means on said frame actuatable by the raising of said frame for locking said male and female connecting members together.

8. Loading apparatus comprising, an elevationally positionable elongated frame pivotally mounted on a vehicle, an upright triangle mounted on a front central portion of said frame, a material container having an inverted V-shaped member secured thereto and complementary to said triangle, said triangle being insertable within said V-shaped member upon positioning said container generally adjacent said triangle and said triangle being wedgingly held therein to lift said container as said frame is raised, a sweep arm pivotally connected to one end of said frame and having a free end swingable between laterally offset and centrally located positions with respect to said frame, said free end of said arm having container engaging means provided thereon, and power means mounted on said frame for swinging said arm between said positions to selectively move a laterally offset container adjacent said triangle of said frame and to move said container to a laterally offset position as desired.

9. In a loader apparatus, an elongated elevationally positionable frame adapted to be pivotally connected to a vehicle, an upright male member mounted on a front central portion of said frame and having an upper converging portion thereon, a container having an interengaging female member formed thereon, said male member being complementary to said female member and insertable therewithin when said container is positioned generally centrally of said frame and being wedgingly secured within said female member as said frame is raised, a sweep arm pivotally connected to one end of said frame and having a container engaging means on its free end and swingable between laterally offset and centrally located positions with respect to said frame, and power means on said frame for pivoting said sweep arm between said positions to selectively move a laterally offset container adjacent said male member of said frame and from said male member to a laterally offset position.

10. In a loader mechanism, an elongated and elevationally positionable frame pivotally mounted on a vehicle, an upright triangle-shaped male member pivotally mounted on a front central portion of said frame, a hydraulic servo-motor connected between said frame and said male member for tilting the latter, a material container, an inverted V-shaped female member secured to one side of said container and complementary to said male member, said male member insertable in said female member when said container is positioned generally centrally of said frame, and said male member wedgingly held within said female member when said frame is raised, a sweep arm pivotally secured at one end to one end of said frame and having container grasping means at its other end swingable between laterally offset and centrally located positions with respect to said frame, a second hydraulic servo-motor mounted on said frame for swinging said arm between said positions to position a laterally offset container centrally of said frame and to move a centrally positioned container to a laterally offset position as desired, a hydraulic selector valve mounted on said frame, said servo-motors connected to said valve for independent operation thereby, and an electric shifter mechanism mounted on said frame and having a connection with said valve for operating the latter.

References Cited in the file of this patent

UNITED STATES PATENTS

| Number | Name | Date |
|---|---|---|
| 166,364 | Hartwell | Aug. 3, 1875 |
| 1,868,562 | Chubb | July 26, 1932 |
| 2,525,384 | Troutman | Oct. 10, 1950 |
| 2,565,792 | Wagner | Aug. 28, 1951 |
| 2,643,011 | Brisson et al. | June 23, 1953 |
| 2,643,515 | Harsch | June 30, 1953 |
| 2,796,283 | Grazier | June 18, 1957 |
| 2,799,418 | Haldimann | July 16, 1957 |
| 2,808,161 | Gentile | Oct. 1, 1957 |
| 2,824,658 | Beastey | Feb. 25, 1958 |
| 2,908,411 | Ambarcumian | Oct. 13, 1959 |